United States Patent [19]

Randall et al.

[11] Patent Number: 5,500,721
[45] Date of Patent: Mar. 19, 1996

[54] POWER SUPPLY TOPOLOGY ENABLING BIPOLAR VOLTAGE OUTPUT FROM A SINGLE VOLTAGE INPUT

[75] Inventors: John M. Randall, Webster, N.Y.; Clifford K. Friend, Tehachapi, Calif.

[73] Assignee: Xerox Corporation, Stamford, Conn.

[21] Appl. No.: 367,608

[22] Filed: Jan. 3, 1995

[51] Int. Cl.$^6$ ............................ G03G 15/00; H02M 3/00
[52] U.S. Cl. ................................. 355/265; 363/61
[58] Field of Search ................................. 355/200, 245, 355/265; 363/61, 63, 127; 361/235; 307/106

[56] References Cited

U.S. PATENT DOCUMENTS

| | | | |
|---|---|---|---|
| 3,316,475 | 4/1967 | Hayama et al. | 363/61 |
| 3,760,255 | 9/1973 | Grodinsky | 363/127 X |
| 3,851,240 | 11/1974 | Park et al. | 363/127 X |
| 4,138,635 | 2/1979 | Quinn | 363/61 X |
| 4,819,145 | 4/1989 | Maeba | 363/63 |

*Primary Examiner*—Joan H. Pendegrass
*Attorney, Agent, or Firm*—Oliff & Berridge

[57] ABSTRACT

A power supply circuit which converts an A.C. signal into an output signal that combines A.C. and D.C. voltages components. The circuit uses a voltage doubler topology with transistors. The transistors are controlled by waveform generators, which generate a series of pulses. By adjusting the duty cycle of the pulses, the appropriate D.C. voltages components can be formed. By adjusting the duty cycle of the positive output producing pulses and negative output producing pulses relative to each other, the required A.C. signal can be adjusted. A scavengeless developer in a xerographic machine requires three bias voltage inputs. The power supply circuit can be attached to a transformer connected to an appropriate A.C. power source to produce the required voltage signals to control the operation of the developer.

35 Claims, 12 Drawing Sheets

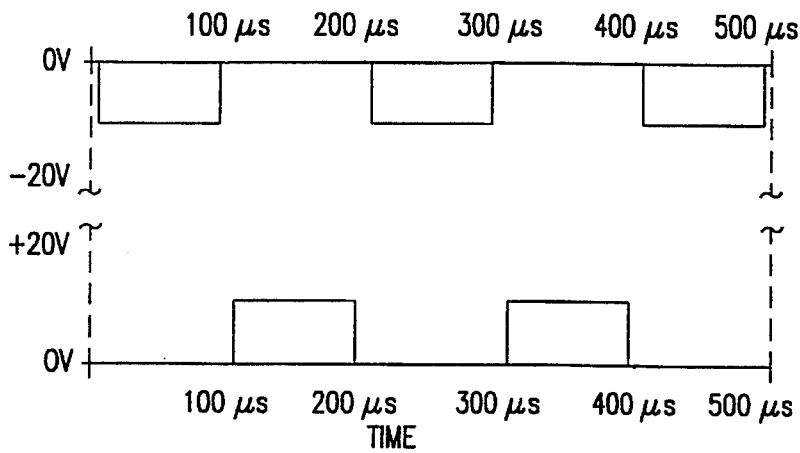
FIG.5A
FIG.5B
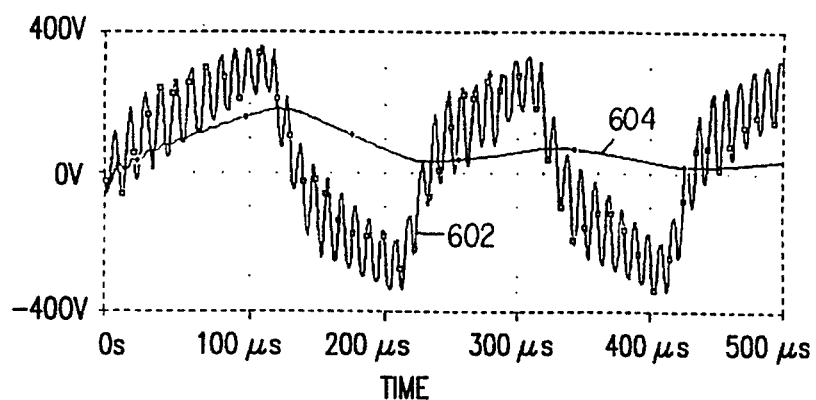
FIG.5C
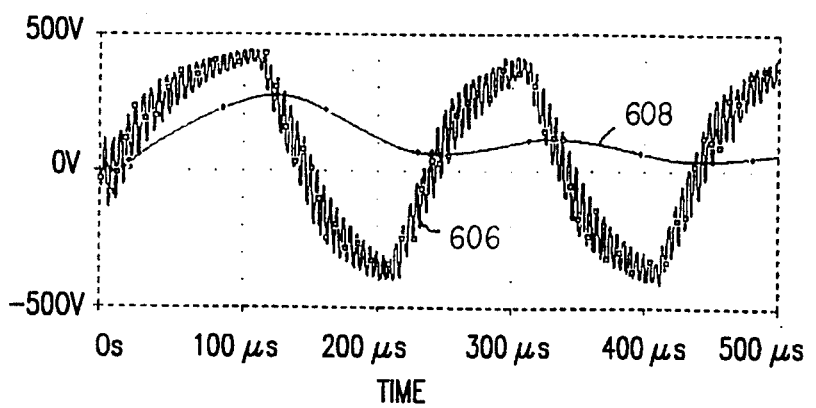
FIG.5D
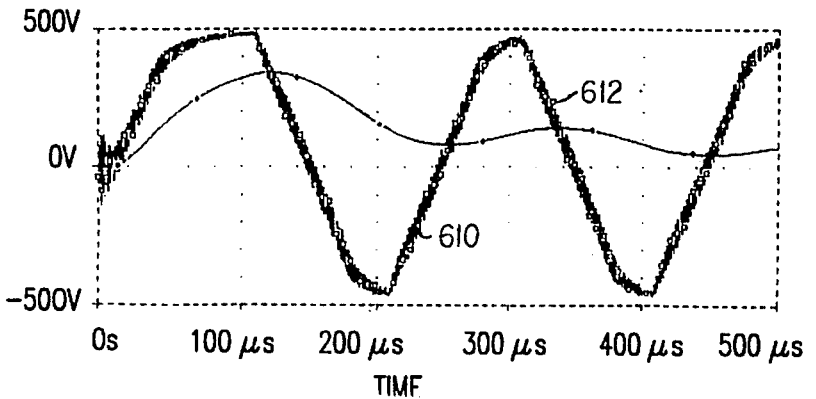
FIG.5E

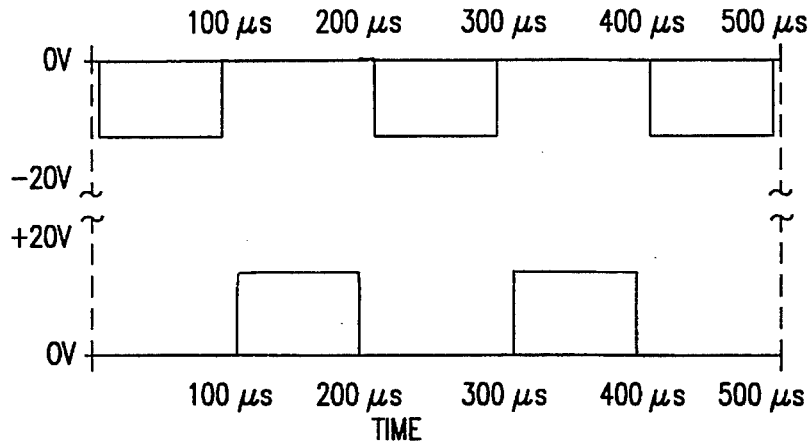
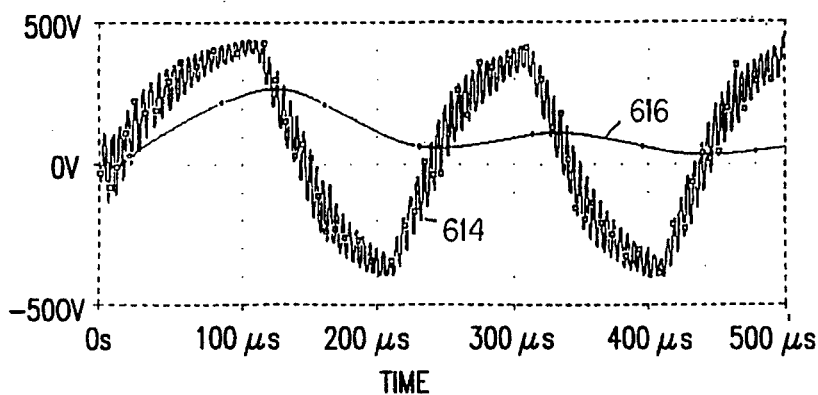
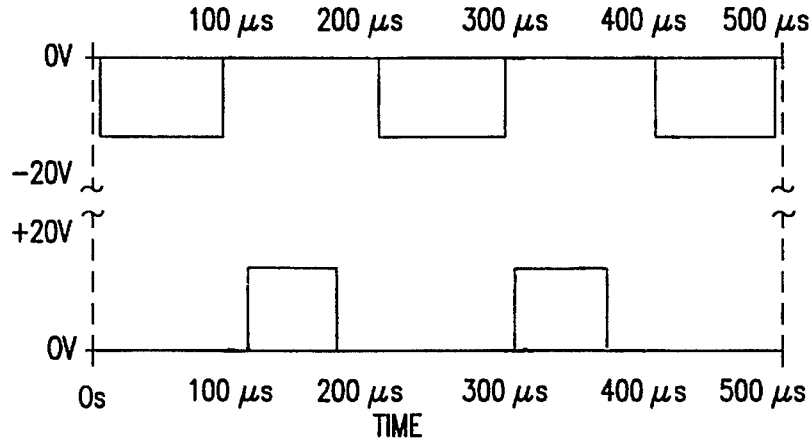
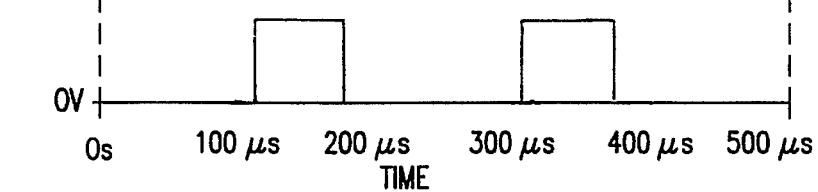
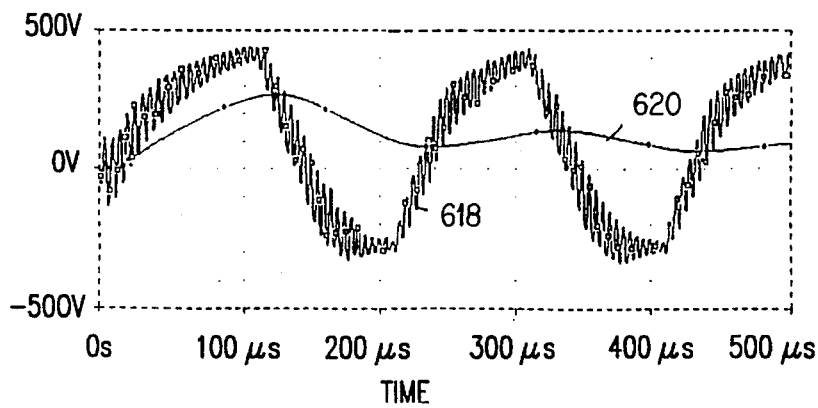

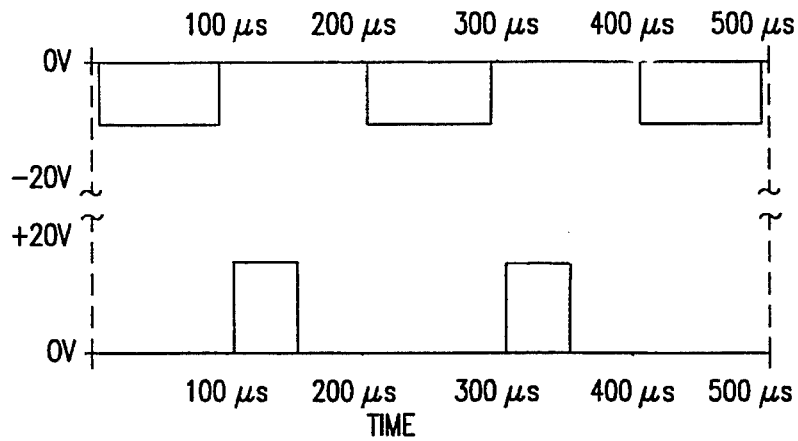
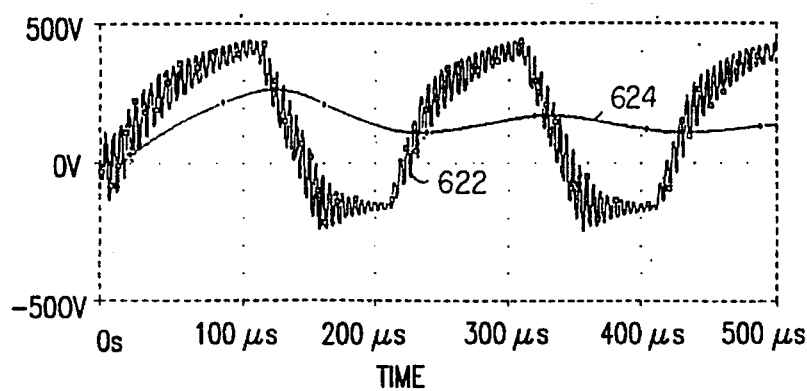
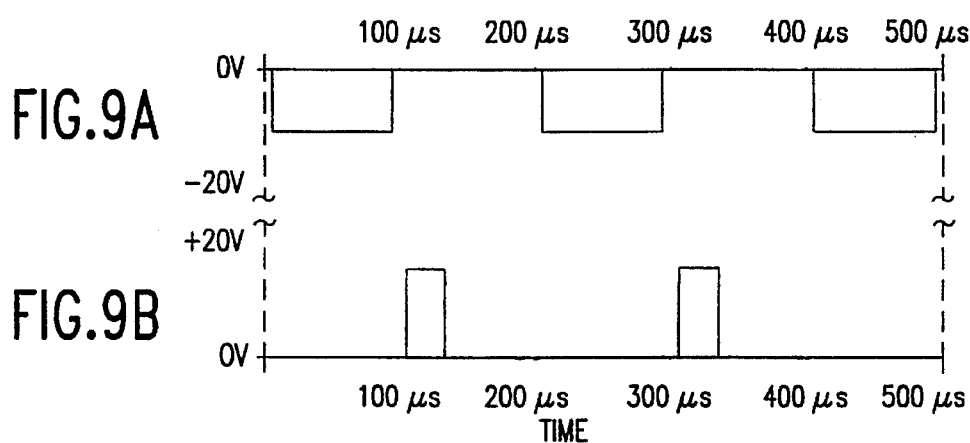
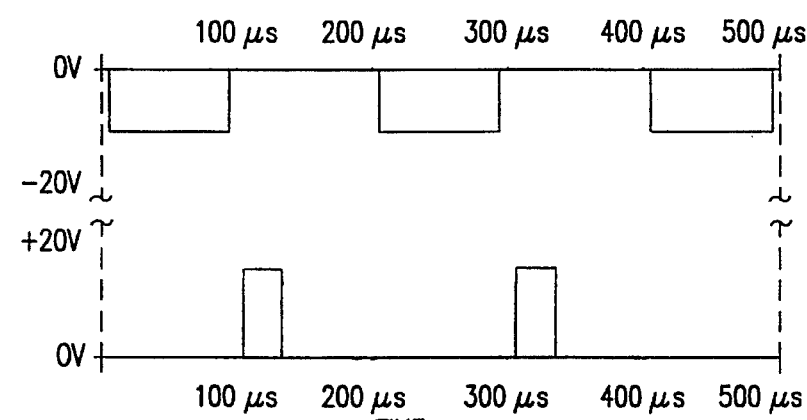
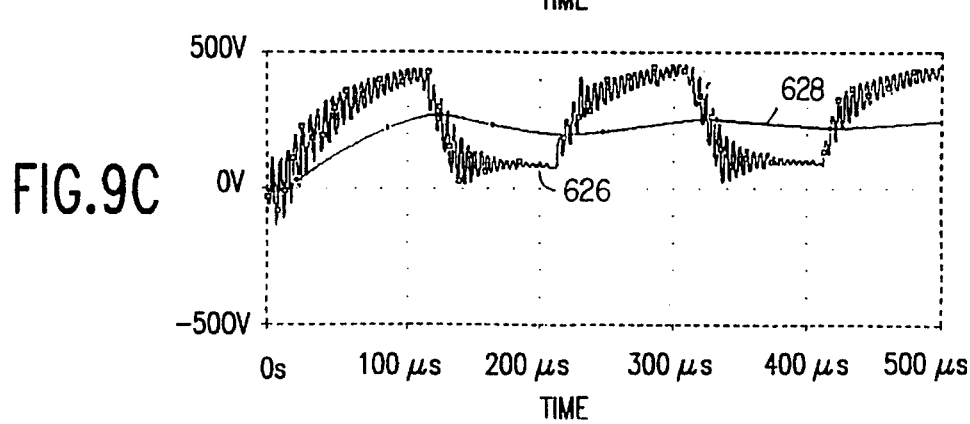

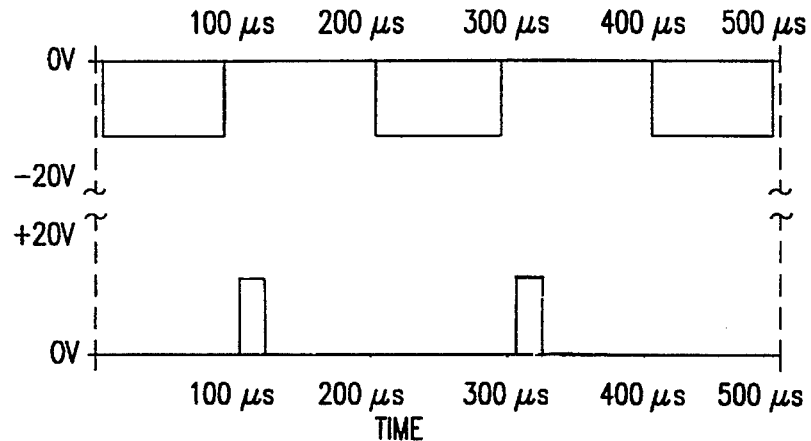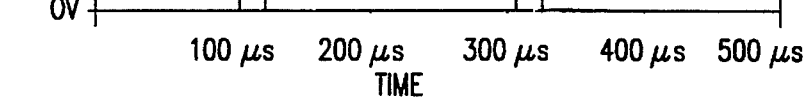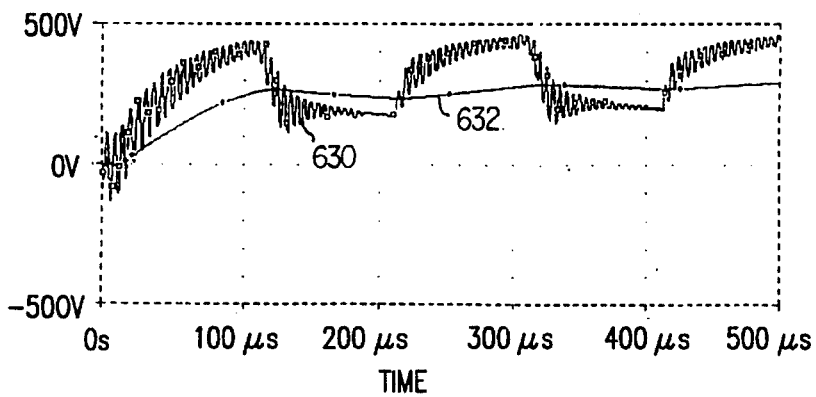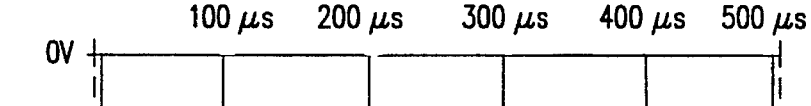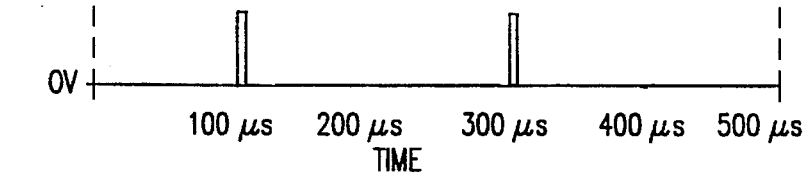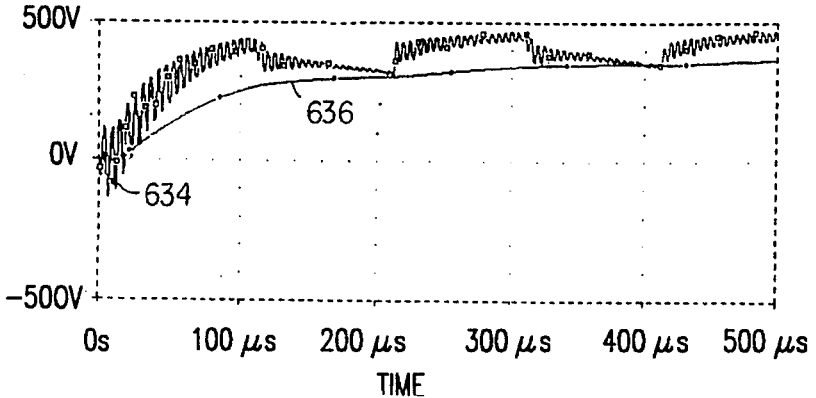

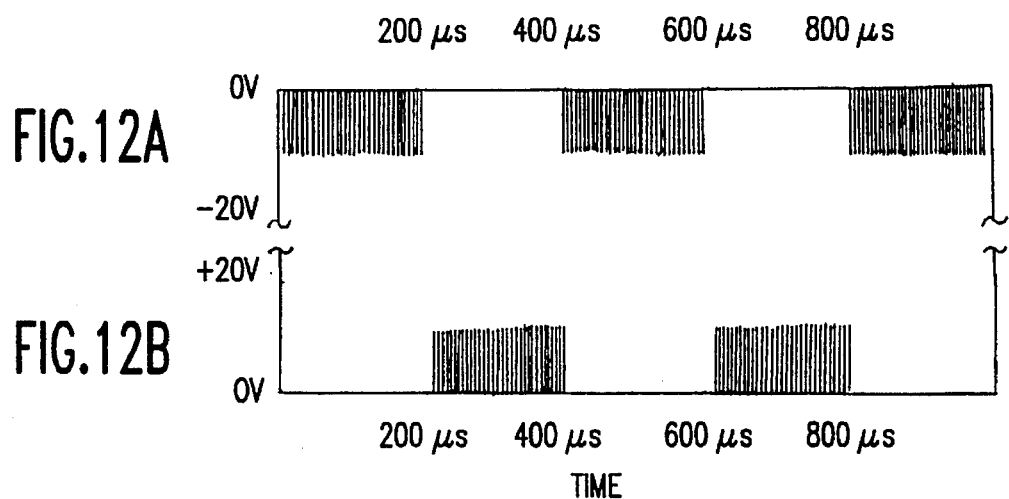
FIG.12A
FIG.12B
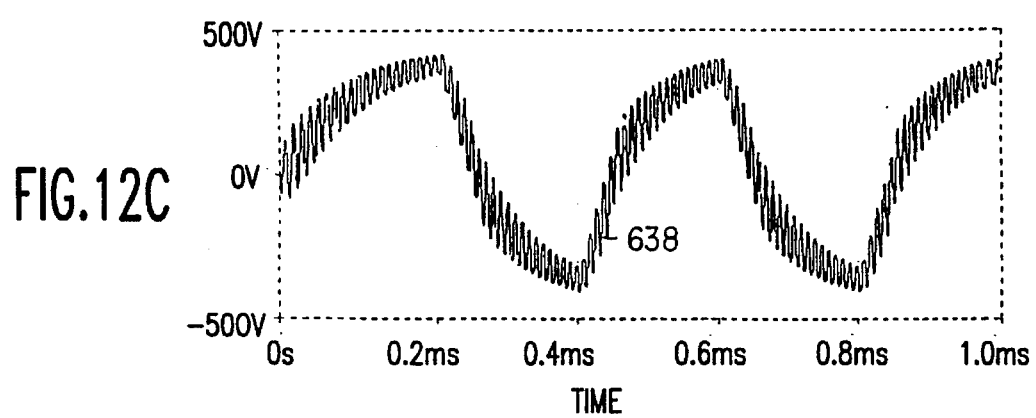
FIG.12C
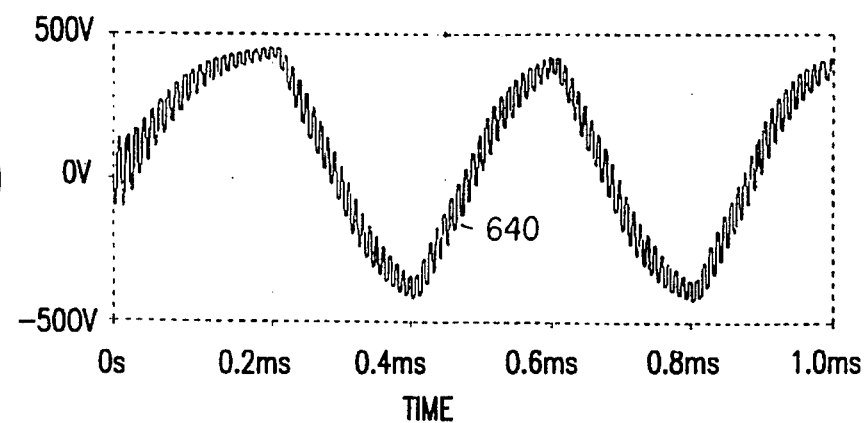
FIG.12D

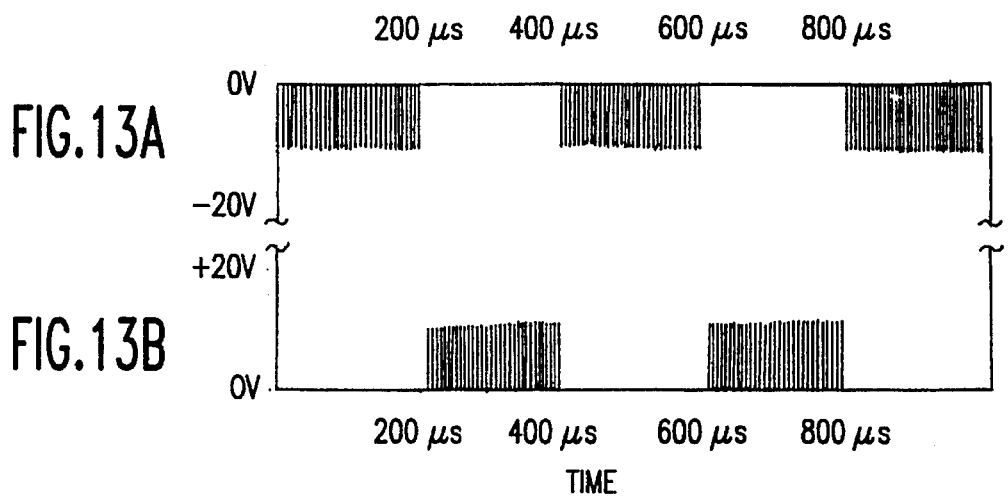
FIG.13A
FIG.13B
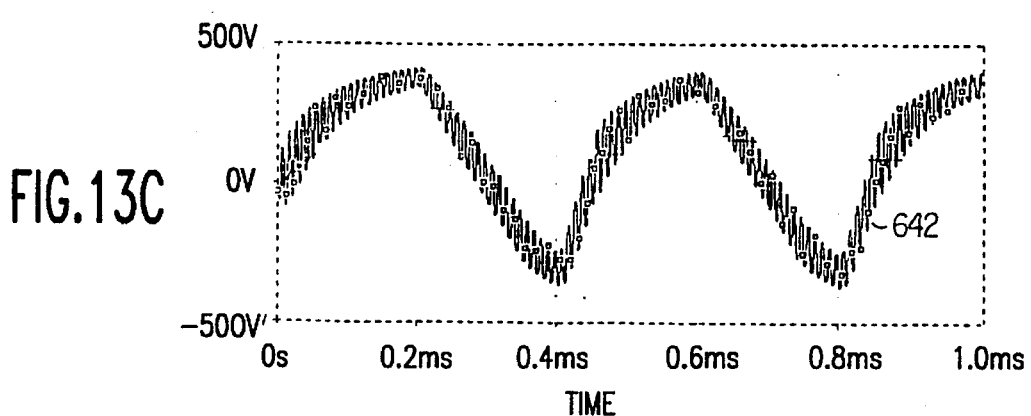
FIG.13C
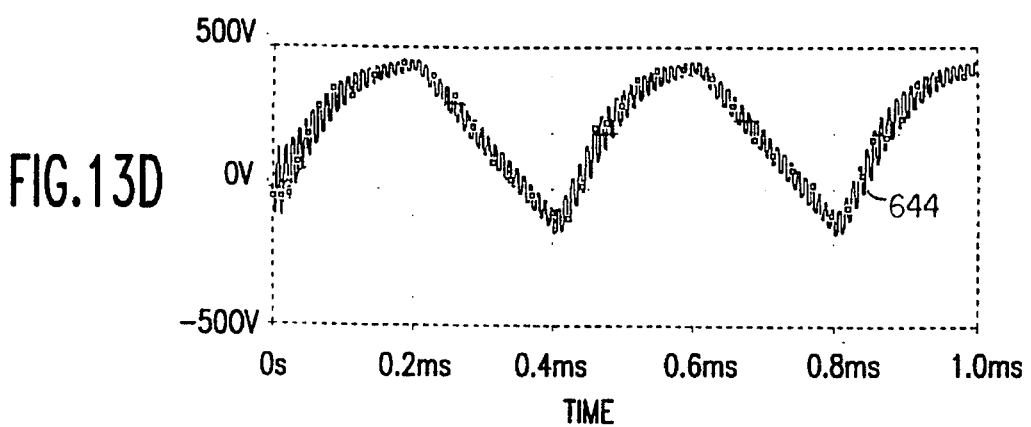
FIG.13D

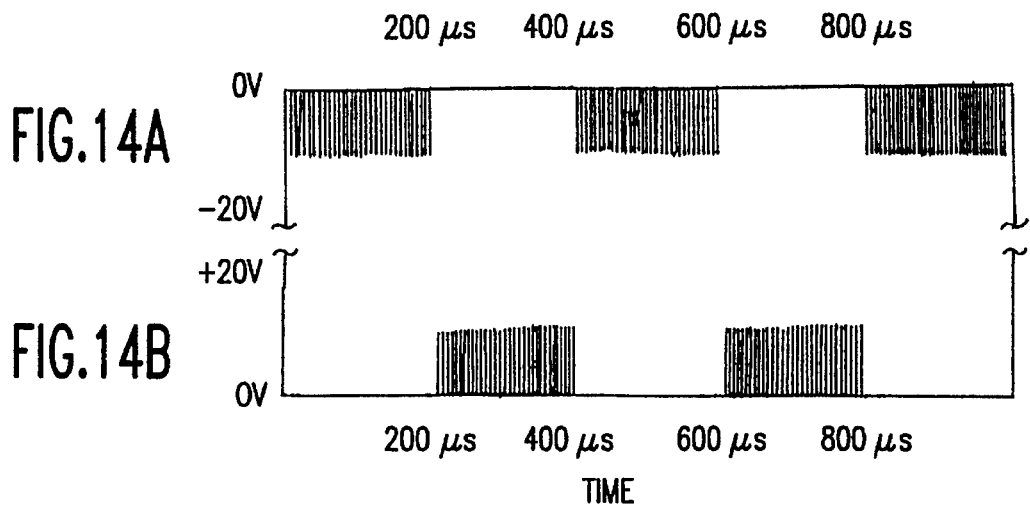
FIG.14A
FIG.14B
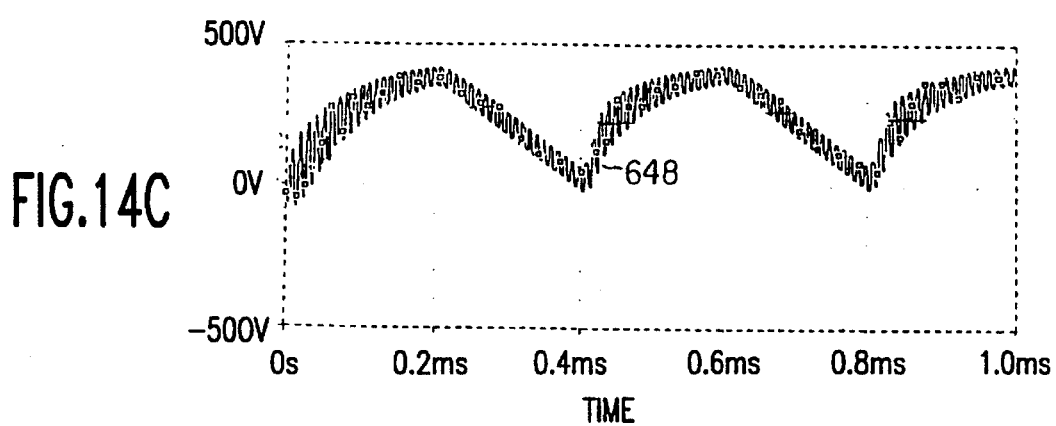
FIG.14C
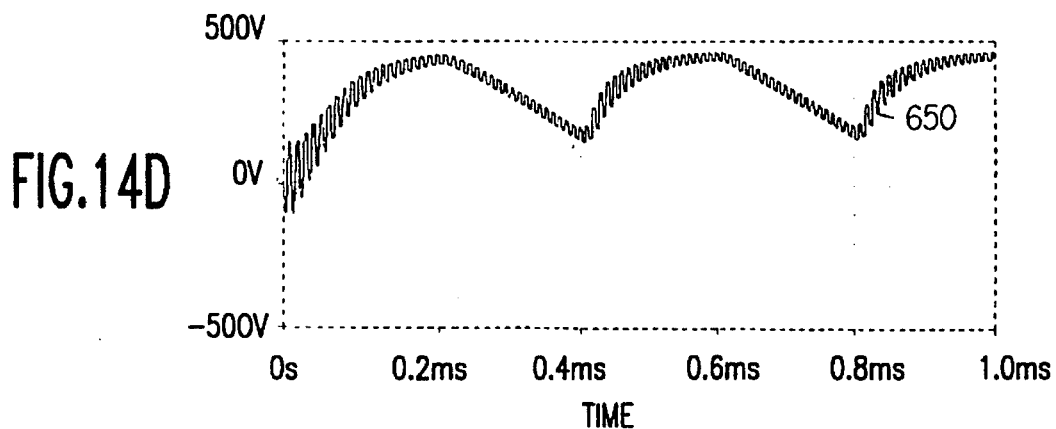
FIG.14D

POWER SUPPLY TOPOLOGY ENABLING BIPOLAR VOLTAGE OUTPUT FROM A SINGLE VOLTAGE INPUT

BACKGROUND OF THE INVENTION

1. Field of the Invention

This invention relates to improvements in power supply topology. More particularly, the power supply circuit of this invention generates a bipolar output signal that is a combination of A.C. and D.C. voltages.

2. Description of Related Art

In printing and electrophotographic applications such as xerography, a charge retentive surface is electrostatically charged to form a latent image. The latent image is then developed and transferred to a substrate. Although the preferred embodiments are described in reference of xerography, the invention is applicable to any image forming apparatus that uses a toner developer to form an image on an electrostatically charged latent image.

Referring to FIG. 1, belt 10 moves in the direction of arrow 12 to advance successive portions of the belt sequentially through the various processing stations disposed about the path of movement.

Belt 10 is entrained about stripping roller 14, tension roller 16 and drive roller 20. Drive roller 20 is coupled to a motor (not shown) by suitable means such as a belt drive. Both stripping roller 14 and tension roller 16 are rotatably mounted. These rollers are also idlers which rotate freely as belt 10 moves in the direction of arrow 12.

At charging station A, a charging device 22 charges the photoreceptor belt 10 to a relatively high, substantially uniform negative potential.

At exposure station B, an original document is positioned face down on a transparent platen 30 for illumination with flash lamps 32. Light rays reflected from the original document are reflected through a lens 34 and projected onto a charged portion of photoreceptor belt 10 to selectively dissipate the charge thereon. The electrostatic latent image is formed on the belt 10.

Thereafter, belt 10 advances the electrostatic latent image to development station C. A hybrid scavengeless developer unit 80 generates a cloud of toner particles adjacent the electrostatic latent image. The latent image attracts the toner particles, thereby forming toner powder images on photoreceptor belt 10. If color images are formed, then a separate developer 80 for each color is needed.

At transfer station D, a sheet of support material such as a copy sheet (paper) is moved into contact with the developed latent image on belt 10. A supply tray 48, which may hold different quantities, sizes and types of support materials, supplies copy sheets along conveyor 46 and rollers 44. First, the latent image on belt 10 is exposed to a pretransfer light from a lamp (not shown) to reduce the attraction between photoreceptor belt 10 and the toner powder image thereon. Next a corona generating device, a transfer corotron 40, charges the copy sheet to the proper potential so that it is tacked to photoreceptor belt 10 and the toner powder image is attracted from photoreceptor belt 10 to the copy sheet. After transfer, a detack corotron 42 charges the copy sheet toward the opposite polarity to detack the copy sheet from belt 10, whereupon the sheet is stripped from belt 10 at stripping roller 14.

A cleaner module 26 is located before the charging station A. The cleaner module 26 removes excess toner from the belt 10.

Fusing station E includes a fuser assembly, which permanently affixes the transferred toner powder images to the copy sheets. Preferably, the fuser assembly includes a heated fuser roller 72 adapted to be pressure engaged with a pressure roller 74 (also called a back-up roller.) The toner powder image on the copy sheet is pressed against the heated fuser roller 72. In this manner, the toner powder image is permanently affixed to the copy sheet. The copy sheet is ejected.

The developer 80 will be described in more detail with reference to FIG. 2. A thin layer of non-magnetic toner is formed on the surface of the donor roller 84, which is usually a metal cylinder of aluminum or stainless steel having a dielectric coating. The magnetic roller 82 contacts the toner to charge the toner particles. The toner particles are then attracted to the donor roller 84. The amount of toner to be supplied to the donor roller 84 can be electrically controlled by a DC voltage applied by power source 96 with respect to the magnetic roller 82. The magnetic roller 82 can be electrically grounded or also charged by power supply 94 depending on the operating conditions required.

At the entrance of housing 88, powder cloud wires 92 are charged via power supply 98. An AC plus DC voltage differential is formed between the powder cloud wires 92 and the donor roller 84. The toner "flies" off of the donor roller 84 to form a cloud of toner.

A typical photosensitive surface is charged, for example, to approximately negative 800 volts. Light discharges sections of the photosensitive surface to form the latent image. The toner in the toner cloud is charged to approximately negative 700 volts to form a bias between the charges of the latent image and the donor roller. Toner flies across the gap from the entrance of the developer 80 to the discharged sections of the latent image on the belt 10. The gap is preferably under 300 µm.

At least two separate power supplies of opposite polarity are used in these types of developers to provide the positive and negative voltages. An adding network is used to supply positive voltage during the load and develop cycles and negative voltage during the remaining portion of the print job cycle. Thus, the output of one power supply of each bipolar pair is wasted during the portion of the job cycle when it is not used. Further, approximately 75% of the power is consumed by the adding network. Therefore, the control of each developer wastes a large amount of power and demands that each such pair of internal power supplies be larger. Furthermore, each developer has duplicative parts, which add to the cost and maintenance of the developers. Beyond these paired bipolar D.C. power supplies, additional A.C. power supplies must be provided to supply the A.C. portions of the required developer biases.

SUMMARY OF THE INVENTION

An object of the invention is to provide a single power supply circuit that generates an output with both A.C. and D.C. voltages.

A further object of the invention is to provide a simple circuit for bipolar output such that each power supply forms positive and negative voltages at the output.

A further object of the invention is to provide a power supply topology, which has a common power source, used to supply all three of the voltage outputs needed for controlling the developer.

Another object of the invention is to further provide that each output signal meets a required D.C. voltage in a power efficient way. The invention eliminates the two internal power supplies and a power wasting voltage divider to form the necessary voltage output.

A power supply circuit of the invention converts an A.C. signal into an output signal that consists of A.C. and D.C. voltage components. The circuit uses a voltage doubler topology with transistors. The transistors are controlled by pulse waveforms generated as a series of pulses. By adjusting the duty cycle of the pulses, the appropriate D.C. voltage components can be formed. By adjusting the duty cycle of the pulses to both the positive output and negative output voltage doublers relative to each other, the required A.C. signal can be adjusted.

A scavengeless developer in a xerographic machine requires three voltage inputs: one for the magnetic roller; one for the donor roller; and one for the powder cloud wires. The power supply circuit of the invention is connected to the secondary windings of a transformer. The primary windings of the transformer are connected to an A.C. power source. The power supply circuit generates the three output signals with the combined A.C. and D.C. voltages.

BRIEF DESCRIPTION OF THE DRAWINGS

For a better understanding of the invention and further features thereof, reference is made to the following detailed description of the invention to be read in connection with the accompanying drawings wherein:

FIGS. 5A–5E show some start up waveforms for varying the carrier frequencies to three different values as the input A.C. signal;

FIGS. 6A–6C show the output waveform of the power supply circuit of the second preferred embodiment when a constant input pulse with a duty cycle of 99% at input D relative to pulse width at input C is used;

FIGS. 7A–7C show the output waveform of the power supply circuit of the second preferred embodiment when a constant input pulse with a duty cycle of 70% at input D relative to pulse width at input C is used;

FIGS. 8A–8C show the output waveform of the power supply circuit of the second preferred embodiment when a constant input pulse with a duty cycle of 50% at input D relative to pulse width at input C is used;

FIGS. 9A–9C show the output waveform of the power supply circuit of the second preferred embodiment when a constant input pulse with a duty cycle of 30% at input D relative to pulse width at input C is used;

FIGS. 10A–10C show the output waveform of the power supply circuit of the second preferred embodiment when a constant input pulse with a duty cycle of 20% at input D relative to pulse width at input C is used;

FIGS. 11A–11C show the output waveform of the power supply circuit of the second preferred embodiment when a constant input pulse with a duty cycle of 5% at input D relative to pulse width at input C is used;

FIGS. 12A–12D show the output waveforms of the power supply circuit of the second preferred embodiment when higher frequency bursts of input pulses with a pulse width duty cycle of 100% at input D relative to input C are used and the capacitances of the power supply circuit are changed to a second value;

FIGS. 13A–13D show the output waveforms of the power supply circuit of the second preferred embodiment when higher frequency bursts of input pulses with a pulse width duty cycle of 70% at input D relative to input C are used and the capacitances of the power supply circuit are changed to a second value;

FIGS. 14A–14D show the output waveforms of the power supply circuit of the second preferred embodiment when higher frequency bursts of input pulses with a pulse width duty cycle of 50% at input D relative to input C are used and the capacitances of the power supply circuit is are changed to a second value;

DETAILED DESCRIPTION OF PREFERRED EMBODIMENTS

While this invention is described with some detail herein, with specific reference to illustrated embodiments, it is to be understood that there is no intent to be limited to these embodiments. On the contrary, the aim is to cover all modifications, alternatives and equivalents falling within the spirit and scope of the invention as defined by the claims. The preferred embodiments will be described in conjunction with xerographic equipment; however, there are other uses, such as printing, for the circuits of the invention.

Figure 1:
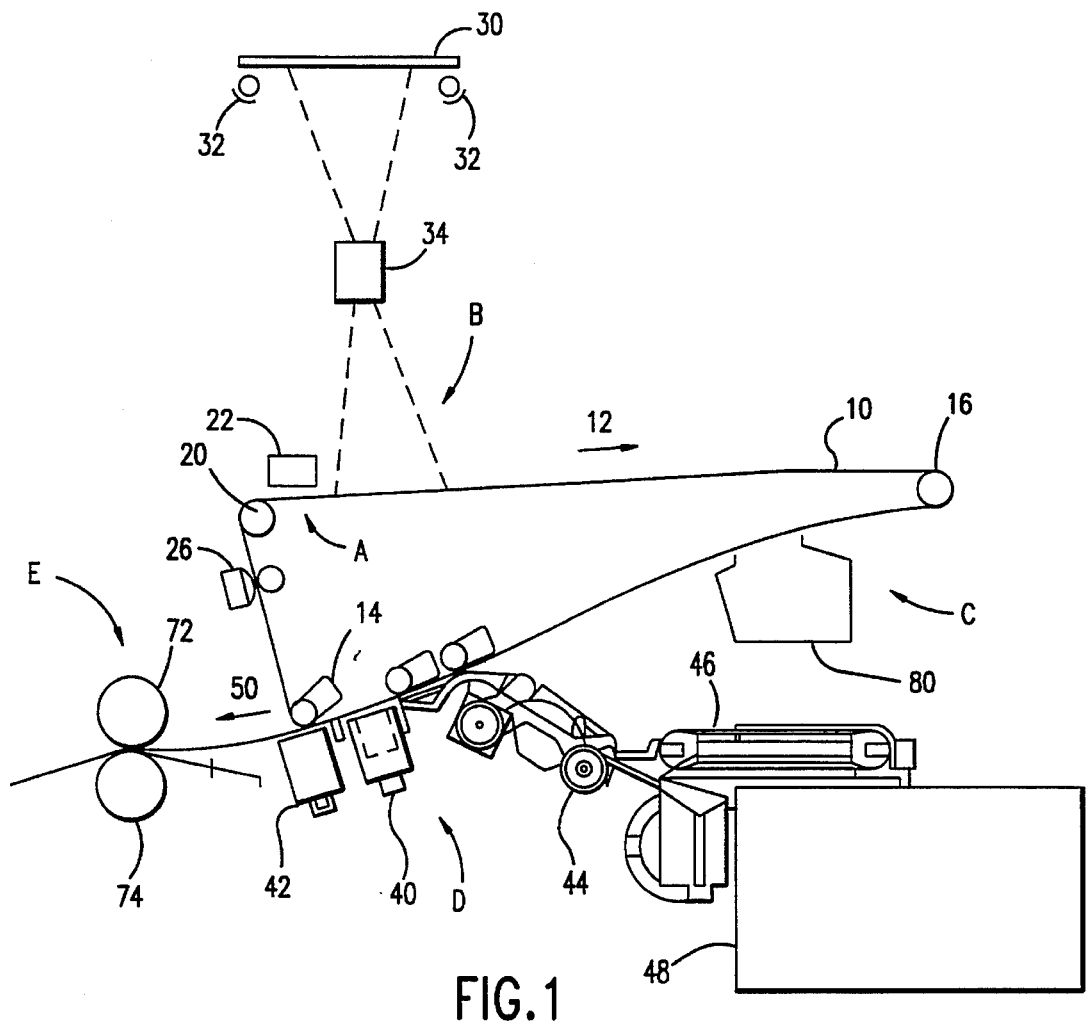
FIG. 1 shows a xerography machine that has a scavengeless developer.
Figure 2:
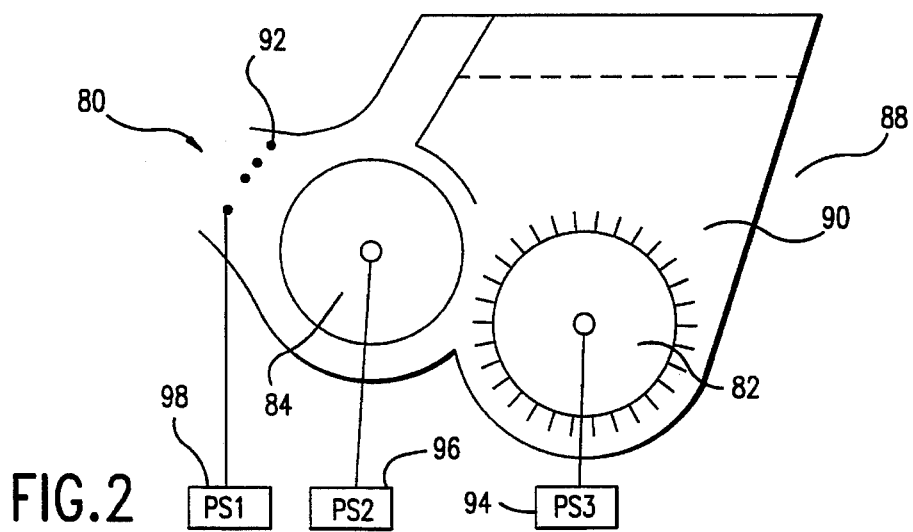
FIG. 2 shows a scavengeless developer that is used to supply charged toner to the latent image on the photosensitive surface without scavenging existing developed images.
Figure 3:
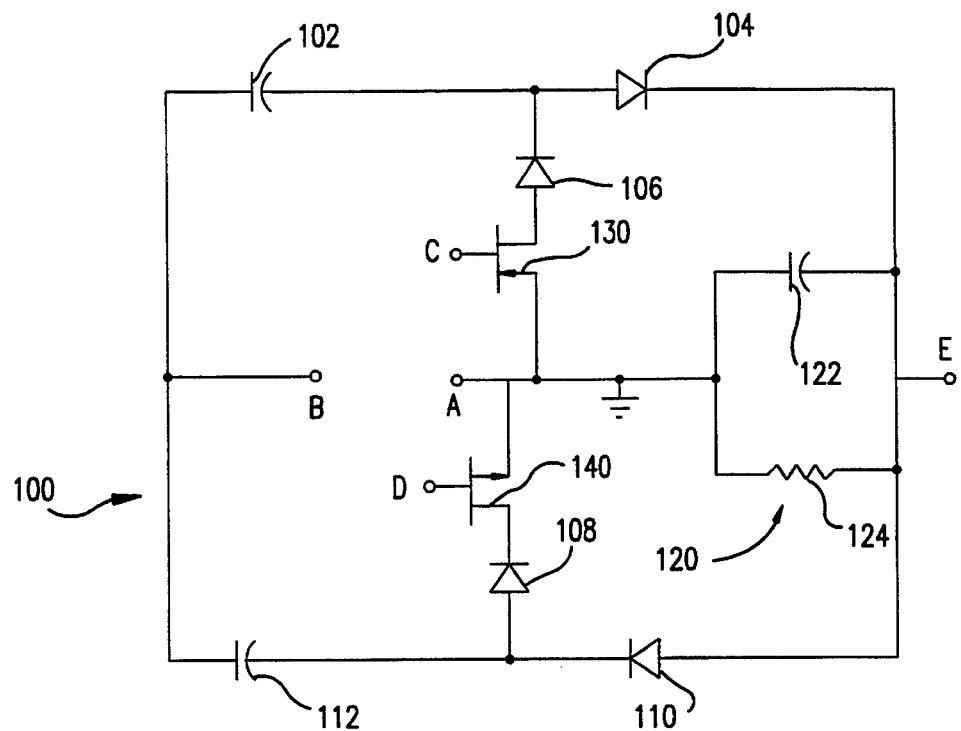
FIG. 3 shows a power supply circuit of the first preferred embodiment for providing a bipolor output voltage containing a combination of D.C. and A.C. voltages.

Referring to FIG. 3, a power supply circuit of the first preferred embodiment is shown. This circuit uses an A.C. power supply connected across inputs A and B to generate an output at E with respect to A having a combination of A.C. and D.C. voltages components.

Diodes 104, 106, 108 and 110 function as a two voltage multipliers to multiply the D.C. voltage potential available from the input A.C. voltage signal. For xerography applications, potentials of hundreds to low thousands of volts are needed. Therefore, the A.C. voltage potential at input B relative to input A is in the mid-hundreds of volts. Small capacitors and magnetics can be used because of the high frequency of the A.C. signal. One such A.C. power supply can drive several similar circuits to provide output voltages for several units, for example, several developers.

Input connector B is connected to a first end of capacitors 102 and 112. The second end of capacitor 102 is connected to the anode of diode 104 and the cathode of diode 106. The anode of diode 106 is connected to the drain of transistor 130. The source of transistor 130 is connected to input connector A and a first end of an RC circuit 120. The RC circuit 120 contains a capacitor 122 connected in parallel with a resistor 124. Input connector A is used as the reference point for the circuit. Therefore, input connector A can be biased with a potential voltage or connected directly to a ground potential. The gate of transistor 130 is connected to input connector C.

The second end of capacitor 112 is connected to the cathode of diode 110 and the anode of diode 108. The cathode of diode 108 is connected to the drain of transistor 140. The source of transistor 140 is connected to the input connector A. The gate of transistor 140 is connected to input connector D. Output connector E is connected to the second end of the RC circuit 120, the cathode of diode 104 and the anode of diode 110.

The operation of the circuit of the first preferred embodiment will now be described. An A.C. signal with a voltage potential of several hundred volts is connected across input connector A and input connector B (the reference connector). If transistor 130 is turned ON and transistor 140 is turned OFF, then a positive D.C. potential is generated at the output connector E. A negative D.C. potential is generated at output connector E when the states of transistor 130 and transistor 140 are reversed, i.e., transistor 130 is OFF and transistor 140 is ON.

However, the circuit has far more advantages than generating a simple positive or negative D.C. voltage potential. Waveform generators, which generated appropriate polarity pulses, can each be connected to inputs C and D each with respect to A. When the ON transistor is pulsed, a pulsating D.C. signal is generated at the output connector E. When using appropriate frequencies and R-C time constants, an output signal can be generated that has a mixture of A.C. and D.C. voltages components. In the prior art, an adding network and two separate power supplies, which each provide opposite polarity, is used to form the D.C. component of output signal. The A.C. component of the output signal is added by a separate transformer at the cost of additional parts. During any cycle periods, the divider attenuated output from only one of the power supplies is used to form the D.C. output signal. Therefore, one output of each pair of D.C. power supplies is wasted. The power in the divider is also wasted. In contrast, the invention forms the output signal from a single power supply and does not waste an idle positive or negative power supply. Neither does it waste power in the divider nor require the added transformer and parts for the A.C.

By applying a series or burst of pulses to the turn ON the transistors followed by a period without pulses, an output signal is generated with a lower frequency component represented by the repetition rate of no pulses to pulses and then to no pulses again. The relative duty cycle of the pulsed widths in the bursts can affect the magnitude of the output signal. By controlling transistors 130 and 140 with periods of no pulses interspersed with periods of pulses, better control range of the output is achieved. Therefore, a biased A.C. signal with the alternate peaks at opposite polarity is easily obtained.

The signal drivers driving the transistors 130 and 140 are direct. However, if other reference potentials are used or if tripling or quadrupling the output signal is needed, higher pulse frequencies for transistor drives assist in lowering the cost of external signal drives. Unfortunately, the circuit 100 has no current limiters. Thus, a huge amount of charge, i.e., large current, is dumped into the RC circuit 120. Although the polarity of the output signal can be changed, there is a loss of fine tuning of the output signal. Therefore, the power supply circuit lacks versatility.

Figure 4:
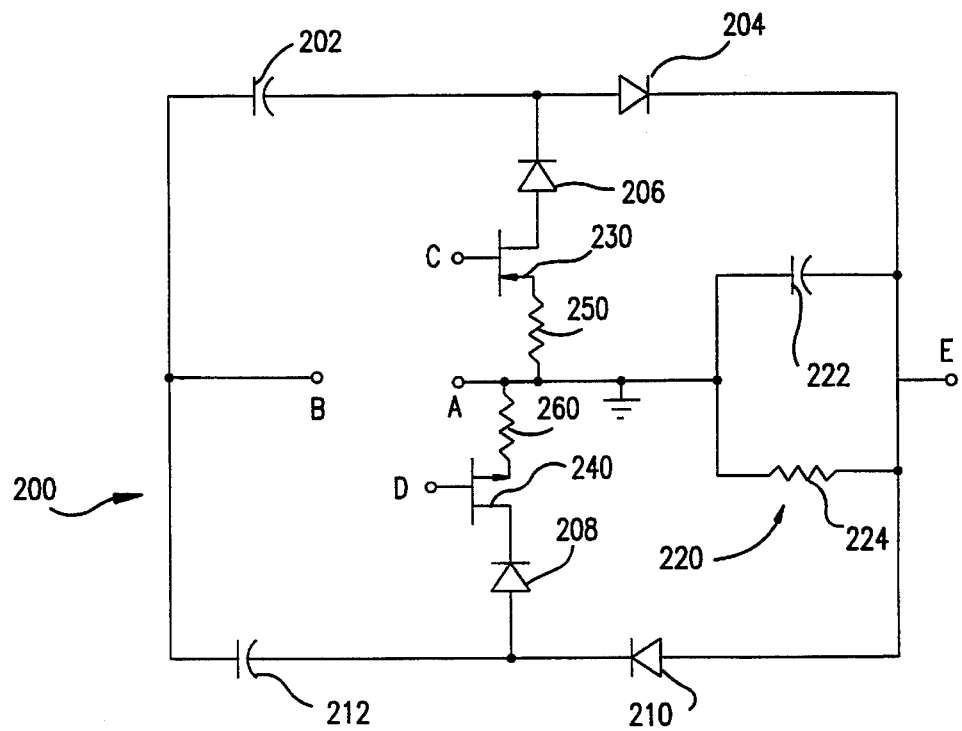
FIG. 4 shows a power supply circuit of the second preferred embodiment.

Referring to FIG. 4, a power supply circuit 200 of the second preferred embodiment is shown. This circuit incorporates current limiting features.

Similar to the first preferred embodiment, diodes 204, 206, 208 and 210 function as a voltage doubler to multiply the input drive voltages supplied to input connectors A and B. Input connector B is connected to a first end of capacitors 202 and 212. The second end of capacitor 202 is connected to the anode of diode 204 and the cathode of diode 206. The anode of diode 206 is connected to the drain of transistor 230. The source of transistor 230 is connected to a first end of a resistor 250. A second end of resistor 250 is connected to a first end of the RC circuit 220 and input connector A, which is used as the reference point of the power supply circuit. The RC circuit 220 contains a capacitor 222 connected in parallel with a resistor 224. The gate of transistor 230 is connected to input connector C.

The second end of capacitor 212 is connected to the cathode of diode 210 and the anode of diode 208. The cathode of diode 208 is connected to the drain of transistor 240. The source of transistor 240 is connected to a first end of resistor 260. A second end of resistor 260 is connected to the input connector A. The gate of transistor 240 is connected to input connector D. Output connector E is connected to the second end of the RC circuit 220, the cathode of diode 204 and the anode of diode 210.

An improvement in the current limiting characteristics of the circuit is provided by the drivers of the capacitor 222. For example, a P-channel MOSFET is used for transistor 230 and an N-channel MOSFET is used for transistor 240. However, transistors 230 and 240 can both be N-channel MOSFETs for example. But in so doing the transistor 230 would be interchanged in position with resistor 250 and be inverted drain to source. Furthermore the input C drive would then be positive and with respect to the anode of diode 206.

The operation of the circuit of the second preferred embodiment is similar to the first preferred embodiment. However, the current limiting resistors 250 and 260 achieve a more versatile circuit. An A.C. signal with a potential of several hundred volts is connected across connector B and connector A (the reference connector). Waveform generators are connected to inputs C and D. FIGS. 5A–14C show a variety of outputs when the input signals to input connectors A–D are altered.

Referring to FIGS. 5A–5E, the frequency of the input A.C. carrier signal is varied. In these figures, a constant pulse width is applied to input connectors C and D during their respective ON periods. In FIG. 5A, the connector C input is ON from approximately 0–100 µs. Then the pulse to connector C is turned OFF during approximately the 100–200 µs period. In FIG. 5B, a pulse is applied to connector D during approximately the 100–200 µs period.

Of course it will be understood that both connectors C and D cannot be on at the same time. Accordingly, there will be a short period of time when both connectors C and D are off between the respective ON persists of the C and D connectors. In the example described above, connector C would actually be shut off at approximately 98 µs, so that when connector D is switched on at 100 µs, both connectors will not be on simultaneously. The same situation applies to each of the descriptions that follow.

FIG. 5C shows the A.C. signal 602 generated at the output connector E. Signal 604 is the average D.C. value of the A.C. signal. However, signal 604 is not actually output, but is only used for comparison with other waveforms discussed herein. The input A.C. signal applied to input connectors A and B has a carrier frequency of 100 KHz and a peak-to-peak magnitude of approximately 500 volts.

FIG. 5D shows the A.C. signal 606 that is output from connector E when the input A.C. signal has a carrier frequency of 200 KHz. By comparing the average signal 608 to the average signal 604 of FIG. 5C, the average signal has the same general shape, but a higher voltage. The output A.C. signal 606 also has a higher voltage (around 450 volts), but has less variation in the A.C. output signal 606 than the A.C. output signal 602.

FIG. 5E shows the A.C. signal 610 that is output from connector E when the input signal has a carrier frequency of 500 KHz. Again, the average signal 612 is similar to the two previous average signals 604 and 608. However, the output A.C. signal 610 has very little variation in the A.C. output signal and also has an even higher voltage (near 500 volts) than the previous waveforms.

FIGS. 6A–11C show the output A.C. signals generated when varying the duration of the pulse input to connector D. In these figures, the input A.C. signal applied to input connectors A and B has a carrier frequency of 200 KHz and a peak-to-peak magnitude of approximately 500 volts.

In FIGS. 6A–6C, a constant pulse width is applied to input connectors C and D during their respective ON periods. Therefore, the pulse input to connector D has a 99% duty cycle relative to the pulse input to connector C. The output A.C. signal 614 formed in FIG. 6C is the same as shown in FIG. 5D. The average D.C. signal 616 is also shown.

In FIG. 7A, the pulse input to connector C is ON from 0–100 μs. Then the pulse to connector C is turned OFF during the 100–200 μs period. In FIG. 7B, the pulse is input to connector D during the 100–170 μs period. Thus, the pulse input to connector D has a 70% duty cycle relative to the pulse input to connector C. In FIG. 7C, the output A.C. signal 618 has a flatter wave pattern in the negative voltage region when the pulse ceases to be input to connector D. Furthermore, the A.C. signal fails to have as large of a negative D.C. magnitude as did the A.C. signal 614. When comparing average D.C. signals 616 and 620, there is a small difference in the resulting waves.

In FIG. 8A, the pulse input to connector C is input from approximately 0–100 μs and then discontinued during approximately the 100–200 μs period. In FIG. 8B, the pulse is input to connector D during approximately the 100–150 μs period. Thus, the pulse input to connector D has a 50% duty cycle relative to the pulse input to connector C.

In FIG. 8C, the output A.C. signal 622 has an even flatter wave pattern in the negative voltage region after the pulse is discontinued during the 150–200 μs period. When comparing average D.C. signals 616 and 624, the variation in the D.C. magnitude is becoming smaller.

In FIG. 9A, the pulse input to connector C is input from approximately 0–100 μs and then discontinued during approximately the 100–200 μs period. In FIG. 9B, the pulse is input to connector D during approximately the 100–130 μs period. Thus, the pulse input to connector D has a 30% duty cycle relative to the pulse input to connector C. In FIG. 9C, the output A.C. signal 626 does not have a negative voltage. The average D.C. signal 628 is nearly flat after the initial increase of charging the RC circuit 120 (described above).

In FIG. 10A, the pulse input to connector C is input from approximately 0–100 μs and then discontinued during approximately the 100–200 μs period. In FIG. 10B, the pulse is input to connector D during approximately the 100–120 μs period. Thus, the pulse input to connector D has a 20% duty cycle relative to the pulse input to connector C. In FIG. 10C, the output A.C. signal 630 does not have a negative voltage similar to the A.C. signal 626 formed with the 30% duty cycle. The average D.C. signal 632 has only a small variation in magnitude.

In FIG. 11A, the pulse input to connector C is input from approximately 0–100 μs and then discontinued during approximately the 100–200 μs period. In FIG. 11B, the pulse is input to connector D during approximately the 100–105 μs period. Thus, the pulse input to connector D has a 5% duty cycle relative to the pulse input to connector C. In FIG. 11C, the output A.C. signal 634 remains in the 400 to 500 volt range. The shape of the average D.C. signal 636 is similar to an exponential curve.

FIGS. 12A–14D show the output A.C. signals generated when varying the duty cycle of a burst of pulses input to connector D relative to the duty cycle of a burst of pulses input to connector C. The capacitance of the power supply circuit 200 is also changed as will be described below. The input A.C. signal applied to input connectors A and B has a carrier frequency of 200 KHz and a peak-to-peak magnitude of approximately 500 volts.

In FIGS. 12A–12D, a burst of pulses is input to input connectors C and D during their respective ON periods. The burst of pulses is input to connector C during approximately the 0–200 μs period. Each pulse has a cycle of 2 μs and is ON (high voltage) for approximately 1 μs. During approximately the 200–400 μs period, no pulses are applied to input connector C. In FIG. 12B, the burst of pulses is input to connector D during approximately the 200–400 μs period. Each pulse also has a cycle of 2 μs and is ON for approximately 1 μs. Therefore, the pulses input to connector D have a 100% duty cycle relative to the pulses input to connector C. Each individual pulse is represented by a line in FIGS. 12A and 12B, however, due to the scale of the Figures the number of pulses shown is not exact.

Referring to FIG. 12C, the output A.C. signal 638 is formed when the capacitors 202, 212 and 222 (see FIG. 4) have a value of 150 pF. In FIG. 12D, the output A.C. signal 640 is formed when the capacitors 202, 212 and 222 (see FIG. 4) have a value of 300 pF. By increasing the capacitance in the circuit of the second preferred embodiment, the variation in the A.C. signal is decreased.

In FIG. 13A, the burst of pulses input during approximately the 0–200 μs period to connector C have a cycle of 2 μs and are ON (high voltage) for approximately 1 μs. In FIG. 13B, the burst of pulses input to connector D during approximately the 200–400 μs period also have a cycle of 2 μs, but are ON (high voltage) for approximately 0.70 μs. Therefore, the pulses input to connector D have a 70% duty cycle relative to the pulses input to connector C. As in FIGS. 12A and B, the pulses shown in FIGS. 13A and B are represented by a plurality of lines.

Referring to FIG. 13C, the output A.C. signal 642 is formed when the capacitors 202, 212 and 222 (see FIG. 4) have a value of 150 pF. By comparing A.C. signals 638 and 642, similar characteristics can be determined. For example, A.C. signal 642 has approximately the same magnitude in the negative voltage region as the A.C. signal 638.

In FIG. 13D, the output A.C. signal 644 is formed when the capacitors 202, 212 and 222 (see FIG. 4) have a value of 300 pF. By comparing the A.C. signals 640 and 644, an even more pronounced decrease in magnitude of the negative voltage is shown. In fact, the A.C. signal 640 barely enters the negative voltage region with capacitors of 300 pF and a 70% duty cycle.

In FIG. 14A, a burst of pulses input during approximately the 0–200 μs period to connector C have a cycle of 2 μs and are ON (high voltage) for approximately 1 μs. In FIG. 14B, the burst of pulses input to connector D during approximately the 200–400 μs period also have a cycle of 2 μs, but are ON (high voltage) for approximately 0.50 μs. Therefore, the pulses input to connector D have a 50% duty cycle relative to the pulses input to connector C. Here again, the pulses are shown as a plurality of individual lines.

Referring to FIG. 14C, the output A.C. signal 646 is formed when the capacitors 202, 212 and 222 (see FIG. 4) have a value of 150 pF. The A.C. signal 646 ceases to have a negative voltage component. In FIG. 14D, the output A.C. signal 648 is formed when the capacitors 202, 212 and 222 (see FIG. 4) have a value of 300 pF. By comparing the A.C. signals 646 and 648, the variations in A.C signal 648 is less than the variation in the signal 646 due to the increase in magnitude of the capacitors' capacitance.

In conclusion, these graphs show that when the ON transistor is pulsed, a pulsating D.C. signal is generated at the output connector E. By controlling the frequency and period of the pulses, an output signal can be generated that has a mixture of A.C. and D.C. voltages. By varying the duty cycle of the pulsed portions of the input signals, the magnitude of the output signal is affected.

The previous diagrams only show the effect of varying the frequency and duration of the pulses applied to input connector D. However, the frequency and duration of the pulses applied to input connector C can also be varied when varying pulses to input connector D. By controlling the pulses applied to both transistors 130 and 140, better control range of the output is achieved. The biased A.C. with the alternate peaks at opposite polarity can be easily obtained.

The best results occur when the drive for transistor 130 at input connector C is out-of-phase with the drive of transistor 140 at input connector D. Also, by increasing the pulse frequency to be higher than the input frequency of the A.C. signal applied to input connectors A and B, the required voltages to the xerographic process elements can be obtained. This higher frequency can be a factor of many times higher.

Figure 15:
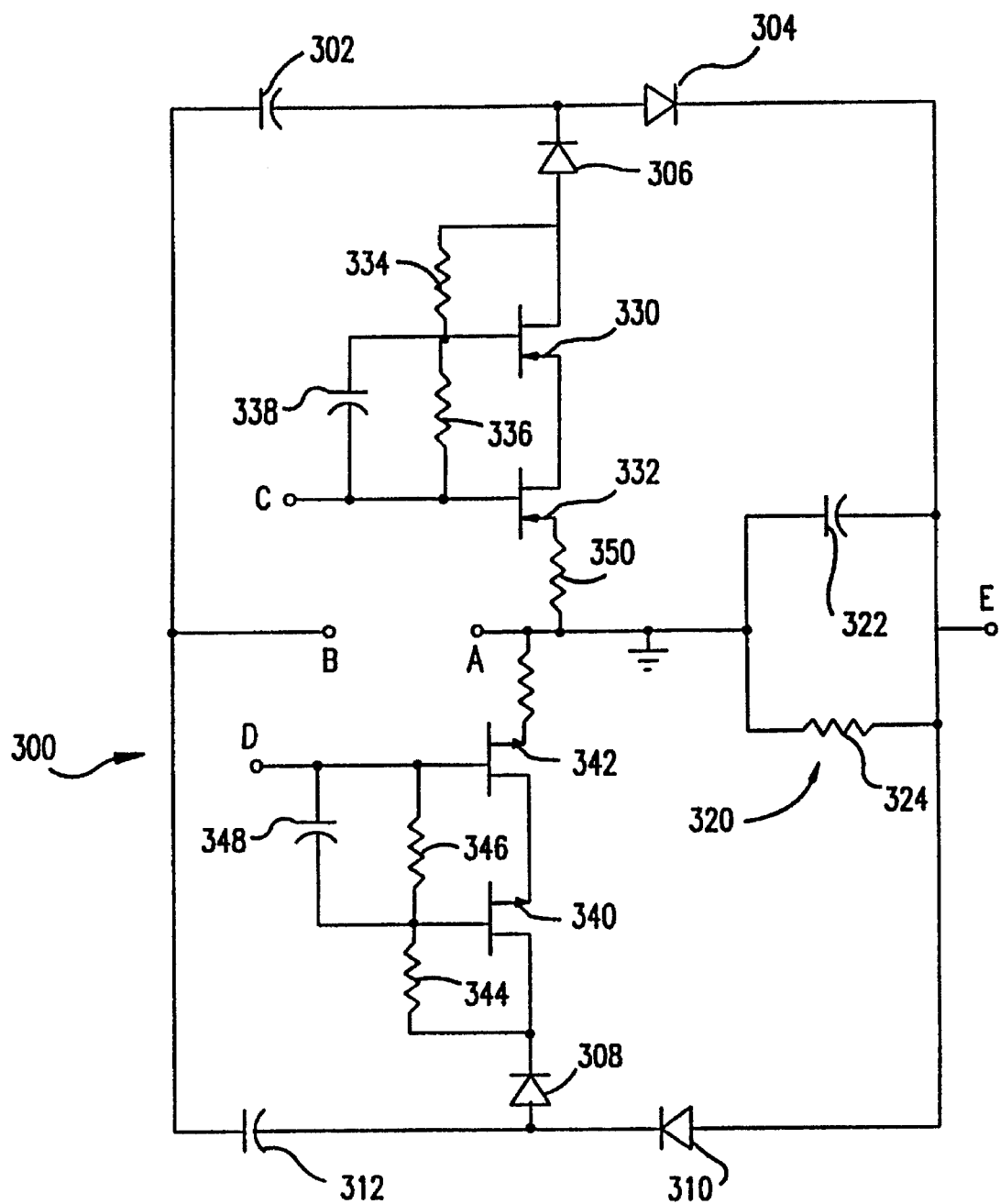
FIG. 15 shows a power supply circuit of the third preferred embodiment.

FIG. 15 shows a third preferred embodiment, which uses multiple transistors to form a dynamic circuit that still retains the current limiting features of the second preferred embodiment. To use standard transistors for the power supply circuits and to provide the required output voltages, it is in some cases necessary to stack the transistors and to provide for reasonably even voltage division across the stack in order to obtain sufficient voltage rated transistors for the required output.

Similar to the first preferred embodiment, diodes 304, 306, 308 and 310 function as voltage multipliers to multiply the D.C. voltage potential available from the A.C. input signal applied to input connectors A and B. Input connector B is connected to a first end of capacitors 302 and 312. The second end of capacitor 302 is connected to the anode of diode 304 and the cathode of diode 306. The second end of capacitor 312 is connected to the cathode of diode 310 and the anode of diode 308. Input connector A is connected to the first end of resistors 350 and 360 and the first end of the RC circuit 320. Output connector E is connected to the second end of the RC circuit 320, which has capacitor 322 connected in parallel with resistor 324. Output connector E is also connected to the cathode of diode 304 and the anode of diode 310.

Transistors 230 and 240 in the second preferred embodiment are each replaced by a pair of stacked transistors. Transistors 330 and 332 are connected in series between the anode of diode 306 and the second end of the resistor 350. A first end of resistor 334 is connected to the anode of diode 306. A second end of resistor 334 is connected to the gate of transistor 330 along with a first end of a capacitor 338 and a first end of a resistor 336. A second end of capacitor 338, which is in parallel with resistor 336, is connected to input connector C and a gate of transistor 332.

Similarly, transistors 340 and 342 are connected in series between the cathode of diode 308 and a second end of the resistor 360. A gate of transistor 340 is connected to a first end of resistors 344 and 346 and a first end of a capacitor 348. A second end of the capacitor 348, which is connected in parallel with resistor 346, is connected to the input connector D and a gate of transistor 342. The second end of resistor 344 is connected to the cathode of diode 308.

The circuit 300 of the third preferred embodiment achieves nearly even voltage division across each pair of the stacked transistors. With this arrangement, the voltage potential at output connector E is closest to the voltage rating of the transistors, which is the drain to source breakdown potential of the transistors. To achieve this goal, it is necessary to carefully select the values of the capacitors 338 and 348 and the resistors 334, 336, 344 and 346.

It is preferable to isolate the low voltage signal drive circuits from the high voltage circuits that are controlled. Isolation of several thousand volts is typically required in xerographic power supply type circuits. Thus, HV FETs (high voltage field effect transistors) can be used in place of the complementary N-MOS and P-MOS transistors described above. An opto-coupler can be used to drive the HV FETs to increase reliability and reduce the number of assembly parts used in the drivers.

Figure 16:
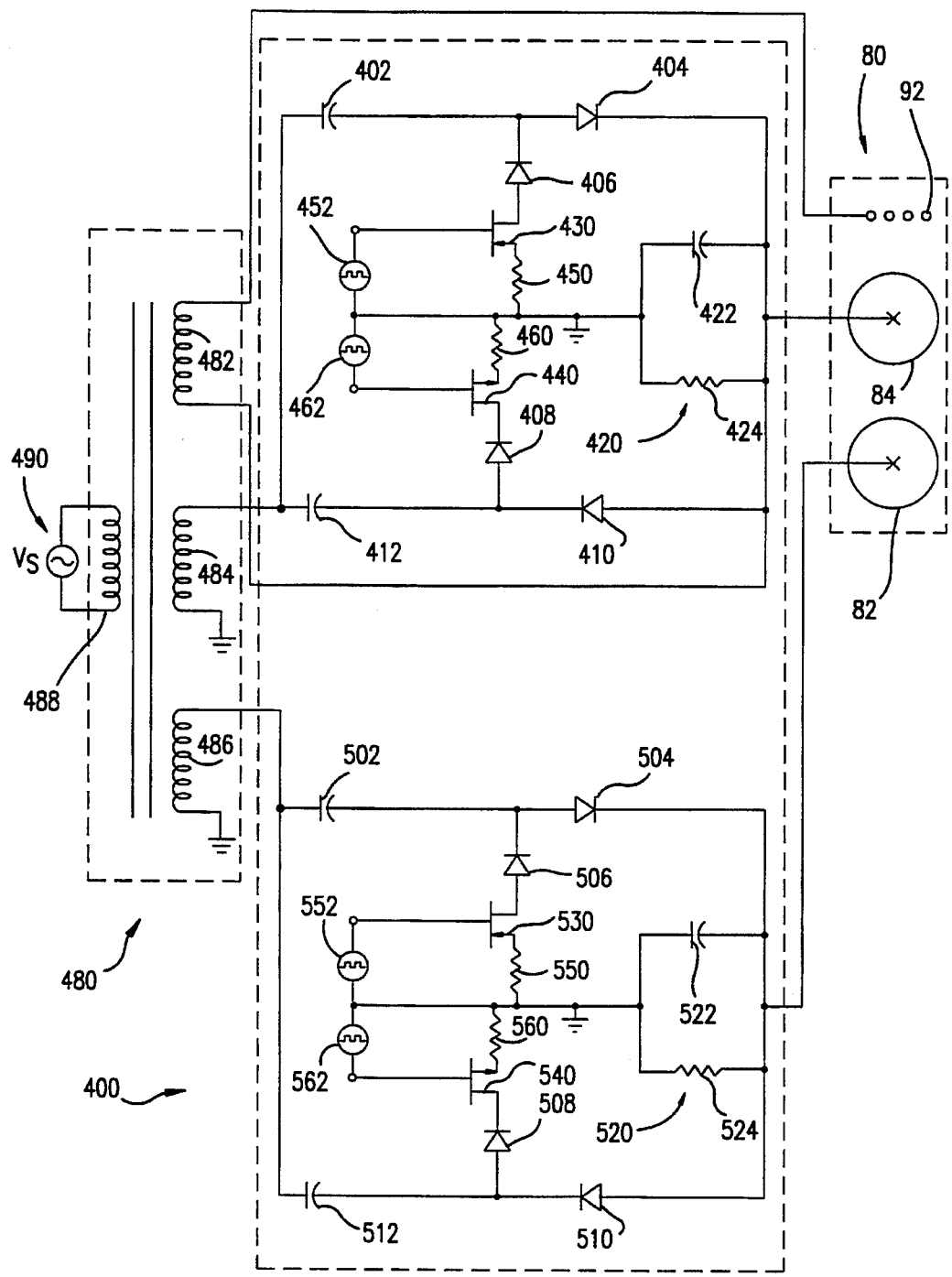
FIG. 16 shows a power supply circuit of the fourth preferred embodiment that provides the three output voltages to control the developer of a xerographic machine.

FIG. 16 shows a fourth preferred embodiment. The power supply circuit 400 is used to control the operation of a developer 80, which requires three voltage signals. The circuit uses the current limiting structure of the second preferred embodiment. However, the first preferred embodiment could be used in the power supply circuit 400.

The primary windings 488 of the transformer 480 are connected to an A.C. power supply 490. The output from the secondary windings 484 is used to control the donor roller 84 of a developer unit 80. A first end of the secondary windings 484 of the transformer 480 is connected to a first end of capacitors 402 and 412. The second end of the secondary windings 484 is connected to ground. The second end of capacitor 402 is connected to the anode of diode 404 and the cathode of diode 406. The drain of transistor 430 is connected to the anode of diode 406 and the source of transistor 430 is connected to a first end of a resistor 450. A gate of the transistor 430 is connected to a first waveform generator 452.

The second end of capacitor 412 is connected to the cathode of diode 410 and the anode of diode 408. The drain of transistor 440 is connected to the cathode of diode 408 and the source of transistor 440 is connected to a first end of the resistor 460. A gate of transistor 440 is connected to a second waveform generator 462.

The first end of the RC circuit 420 is connected to ground and the second end of resistors 450 and 460. The returns of the first and second waveform generators 452 and 462 are connected to the first end of RC circuit 420. The second end of RC circuit 420, which has capacitor 422 connected in parallel with resistor 424, is connected to the cathode of diode 404 and the anode of diode 410.

The output from the secondary windings 486 is used to control the magnetic roller 82 of a developer unit 80. A first end of the secondary windings 486 of the transformer 480 is connected to a first end of capacitors 502 and 512. The second end of the secondary windings 486 is connected to ground. The second end of capacitor 502 is connected to the anode of diode 504 and the cathode of diode 506. The drain of transistor 530 is connected to the anode of diode 506 and the source of transistor 530 is connected to a first end of a resistor 550. The gate of transistor 530 is connected to a third waveform generator 552.

The second end of capacitor 512 is connected to the cathode of diode 510 and the anode of diode 508. The drain of transistor 540 is connected to the cathode of diode 508 and the source of transistor 540 is connected to a first end of the resistor 560. A gate of transistor 540 is connected to a fourth waveform generator 562.

The first end of the RC circuit 520 is connected to ground and the second end of resistors 550 and 560. The returns of the third and fourth waveform generators 562 and 552 are connected to the first end of RC circuit 520. The second end of RC circuit 520, which has capacitor 522 connected in parallel with resistor 524, is connected to the cathode of diode 504 and the anode of diode 510.

The developer 80 is connected to the power supply circuit 400 as follows. The magnetic roller 82 is connected to the second end of RC circuit 520. The donor roller 84 is connected to the second end of RC circuit 420. A first end of the secondary windings 482 of the transformer 480 is connected to the powder cloud wires 92. The second end of the secondary windings 482 is connected to the second end of RC circuit 420.

Pulse generators 452, 462, 552 and 562 control the positive and/or negative voltages applied to the donor roller and the magnetic roller, respectively. Other modes of control can be applied to the transistors to generate a desired mix of A.C. and D.C. voltages. For example, the magnetic roller 82 can be driven with a combination of a large negative D.C. voltage and a small A.C. voltage by making the duty cycle long on pulse generator 562 and very short on pulse generator 552. The balance of long and short can be adjusted to set the average D.C. voltage on the magnetic roller at the desired value.

The donor roller 84 can be driven with an A.C. signal generated by adjusting the duty cycle to achieve the frequency required by the xerographic process. The D.C. voltage of the donor roller is set similarly to the magnetic roller, but its magnitude is adjusted to account for the difference between the donor roller and magnetic roller potentials in a xerographic process.

Figure 17:
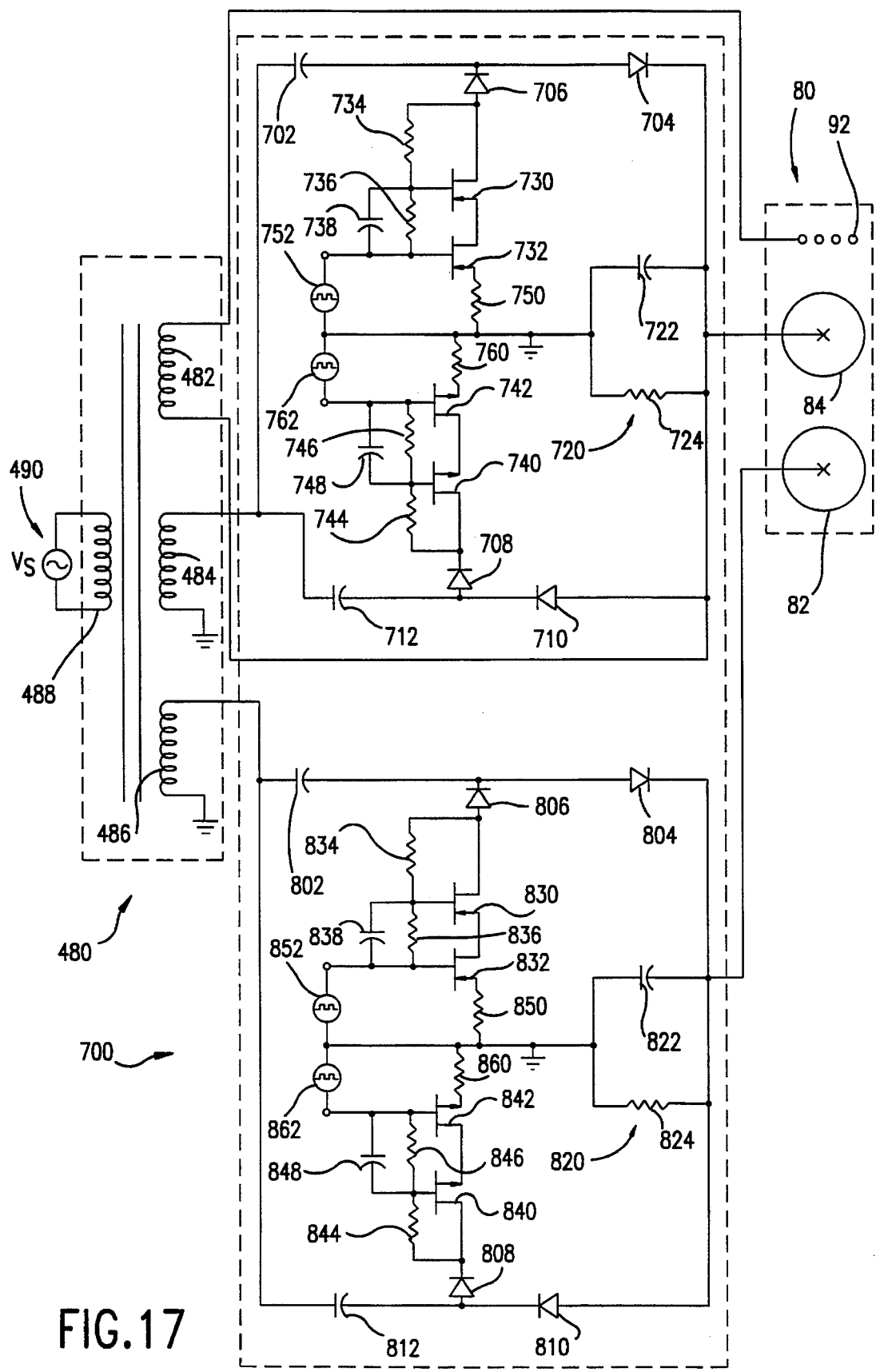
FIG. 17 shows a power supply circuit of the fifth preferred embodiment that provides the three output voltages to control the developer of a xerographic machine.

FIG. 17 shows a fifth preferred embodiment. The power supply circuit 700 is used to control the operation of a developer 80, which requires three voltage signals.

The primary windings 488 of the transformer 480 are connected to an A.C. power supply 490. The output from the secondary windings 484 is used to control the donor roller 84 of the developer 80. A first end of the secondary windings 484 of the transformer 480 is connected to a first end of capacitors 702 and 712. The second end of the secondary windings 484 is connected to ground. The second end of capacitor 702 is connected to the anode of diode 704 and the cathode of diode 706. Transistors 730 and 732 are connected in series. The drain of transistor 730 is connected to the anode of diode 706. The source of transistor 732 is connected to a first end of a resistor 750. A first end of resistor 734 is connected to the anode of diode 706. A second end of resistor 734 is connected to the gate of transistor 730, a first end of a capacitor 738 and a first end of a resistor 736. A second end of capacitor 738, which is in parallel with resistor 736, is connected to a first waveform generator 752 and a gate of transistor 732. The source of transistor 730 is connected to the drain of transistor 732.

The second end of capacitor 712 is connected to the cathode of diode 710 and the anode of diode 708. Transistors 740 and 742 are connected in series. The drain of transistor 740 is connected to the cathode of diode 708. The source of transistor 760 is connected to a first end of the resistor 760. A gate of transistor 740 is connected to a first end of resistors 744 and 746 and a first end of a capacitor 748. A second end of the capacitor 748, which is connected in parallel with resistor 746, is connected to a second waveform generator 762 and a gate of transistor 742. The second end of resistor 744 is connected to the cathode of diode 708. The source of transistor 740 is connected to the drain of transistor 742.

The first end of the RC circuit 720 is connected to ground and the second end of resistors 750 and 760. The returns of the first and second waveform generators 752 and 762 are connected to the first end of RC circuit 720. The second end of RC circuit 720, which has capacitor 722 connected in parallel with resistor 724, is connected to the cathode of diode 704 and the anode of diode 710.

The output from the secondary windings 486 is used to control the magnetic roller 82 of the developer 80. A first end of the secondary windings 486 of the transformer 480 is connected to a first end of capacitors 802 and 812. The second end of the secondary windings 486 is connected to ground. The second end of capacitor 802 is connected to the anode of diode 804 and the cathode of diode 806. Transistors 830 and 832 are connected in series. The drain of transistor 830 is connected to the anode of diode 806. The source of transistor 832 is connected to a first end of a resistor 850. A first end of resistor 834 is connected to the anode of diode 806. A second end of resistor 834 is connected to the gate of transistor 830, a first end of a capacitor 838 and a first end of a resistor 836. A second end of capacitor 838, which is in parallel with resistor 836, is connected to a third waveform generator 852 and a gate of transistor 832. The source of transistor 830 is connected to the drain of transistor 832.

The second end of capacitor 812 is connected to the cathode of diode 810 and the anode of diode 808. Transistors 840 and 842 are connected in series. The drain of transistor 840 is connected to the cathode of diode 808. The source of transistor 842 is connected to a first end of the resistor 860. A gate of transistor 840 is connected to a first end of resistors 844 and 846 and a first end of a capacitor 848. A second end of the capacitor 848, which is connected in parallel with resistor 846 is connected to a fourth waveform generator 862 and a gate of transistor 842. The second end of resistor 844 is connected to the cathode of diode 808. The source of transistor 840 is connected to the drain of transistor 842.

The first end of the RC circuit 820 is connected to ground and the second end of resistors 850 and 860. The returns of the third and fourth waveform generators 862 and 852 are connected to the first end of RC circuit 820. The second end of RC circuit 820, which has capacitor 822 connected in parallel with resistor 824, is connected to the cathode of diode 804 and the anode of diode 810.

The developer 80 is connected to the power supply circuit 700 as follows. The magnetic roller 82 is connected to the second end of RC circuit 820. The donor roller 84 is connected to the second end of RC circuit 720. A first end of the secondary windings 482 of the transformer 480 is connected to the powder cloud wires 92. The second end of the secondary windings 482 is connected to the second end of RC circuit 720.

Similar to the fourth preferred embodiment, pulse generators 752, 762, 852 and 862 control the positive and/or negative voltages applied to the donor roller 84 and the magnetic roller 82, respectively. Other modes of control can be applied to the transistors to generate a desired mix of A.C. and D.C. voltages by adjusting the duty cycle and frequency of the pulses.

The potential of the powder cloud wires 92 relative to the donor roller 84 and the frequency of the A.C. signal is established and fixed by the A.C. source 490 and the secondary windings 482. However, separate control and sourcing could be used.

As an alternative, the transistors 730, 732, 740, 742, 830, 832, 840 and 842 and surrounding circuitry can be replaced with four opto-coupled HV FET transistor assemblies. Thus, complimentary N-MOS and P-MOS transistors would become a single unit. Another alternative is to combine the waveform generators 752 and 762 into a single pulse generator with modulator integrated circuits to form one polarity of signals (pulses). The third and fourth waveform generators can be similarly combined.

Although the invention has been described and illustrated with particularity, it is intended to be illustrative of preferred embodiments. It is understood that the disclosure has been made by way of example only. Numerous changes in the combination and arrangements of the parts, steps and features can be made by those skilled in the art without departing from the spirit and scope of the invention, as hereinafter claimed.

What is claimed is:

1. A power supply circuit comprising:

a first capacitor having a first end connected to a first input connector;

a first diode having an anode connected to a second end of the first capacitor and a cathode connected to an output connector;

a second diode having a cathode connected to the anode of the first diode;

a first current control means having a current path between an anode of the second diode and a reference connector, a controller of the first current control means being connected to a second input connector;

a second capacitor having a first end connected to the first input connector;

a third diode having a cathode connected to a second end of the second capacitor and an anode connected to the output connector;

a fourth diode having an anode connected to the second end of the second capacitor;

a second current control means having a current path between a cathode of the fourth diode and the reference connector, a controller of the second current control means being connected to a third input connector; and an RC circuit connected between the output connector and the reference connector, the RC circuit having a third capacitor and a first resistor connected in parallel.

2. The power supply circuit of claim 1, wherein an A.C. power supply is connected to the first input connector.

3. The power supply circuit of claim 1, wherein waveform generators are connected to the second and third input connectors.

4. The power supply circuit of claim 3, wherein the waveform generators generate pulses at various frequencies and duty cycles.

5. The power supply circuit of claim 4, wherein an output signal is formed that combines A.C. and D.C. voltages.

6. The power supply circuit of claim 5, wherein the D.C. voltages are at least one of a positive voltage and a negative voltage.

7. The power supply circuit of claim 4, wherein the first waveform generator generates pulses that are out of phase with the pulses generated by the second waveform generator.

8. The power supply circuit of claim 1, wherein the reference connector is connected to a ground potential.

9. The power supply circuit of claim 1, wherein the first current control means comprises a first transistor having a first end connected to the anode of the second diode, a second end connected to the reference connector and a gate connected to the second input connector, and wherein the second current control means comprises a second transistor having a first end connected to the reference connector, a second end connected to the cathode of the fourth diode and a gate connected to the third input connector.

10. The power supply circuit of claim 9, wherein the first transistor is one of an N-channel FET, a P-channel FET, a MOSFET, and an HV FET and wherein the second transistor is one of N-channel FET, a P-channel FET, a MOSFET and an HV FET.

11. The power supply circuit of claim 1, wherein the first and second current control means comprise an opto-coupled HV FET assembly.

12. The power supply circuit of claim 1, wherein the first current control means comprises:

a second resistor having a first end connected to the reference connector; and a first transistor having a drain connected to the anode of the second diode, a source connected to a second end of the second resistor and a gate connected to the second input connector; and wherein the second current control means comprises:

a third resistor having a first end connected to the reference connector; and a second transistor having a drain connected to the cathode of the fourth diode, a source connected to a second end of the third resistor and a gate connected to the third input connector.

13. The power supply circuit of claim 1, wherein the first current control means comprises:

a second resistor having a first end connected to the reference connector;

a first transistor having a drain connected to the anode of the second diode, a source and a gate;

a second transistor having a drain connected to the source of the first transistor, a source connected to a second end of the second resistor, and a gate connected to the second input connector;

a third resistor having a first end connected to the anode of the second diode and a second end connected to the gate of the first transistor;

a fourth resistor having a first end connected to the gate of the first transistor and a second end connected to the gate of the second transistor; and a fourth capacitor having a first end connected to the gate of the first transistor and a second end connected to the gate of the second transistor; and wherein the second current control means comprises:

a fifth resistor having a first end connected to the reference connector;

a third transistor having a source connected to a second end of the fifth resistor, a drain, and a gate connected to the third input connector;

a fourth transistor having a source connected to the drain of the third transistor, a drain connected to the cathode of the fourth diode, and a gate;

a sixth resistor having a first end connected to the gate of the third transistor and a second end connected to the gate of the fourth transistor;

a seventh resistor having a first end connected to the gate of the fourth transistor and a second end connected to the cathode of the fourth diode; and a fifth capacitor having a first end connected to the gate of the third transistor and a second end connected to the gate of the fourth transistor.

14. The power supply circuit of claim 13, wherein the first transistor is one of an N-channel FET, a P-channel FET, a MOSFET, and an HV FET, the second transistor is one of an N-channel FET, a P-channel FET, a MOSFET and an HV FET, the third transistor is one of an N-channel FET, a P-channel FET, a MOSFET and an HV FET, and wherein the fourth transistor is one of an N-channel FET, a P-channel FET, a MOSFET and an HV FET.

15. A power supply circuit comprising:

a first capacitor having a first end connected to a first input connector;

a first diode having an anode connected to a second end of the first capacitor and a cathode connected to an output connector;

a second diode having a cathode connected to the anode of the first diode;

a first transistor having a first end connected to an anode of the second diode, a second end connected to a reference connector, and a gate connected to a second input connector;

a second capacitor having a first end connected to the first input connector;

a third diode having a cathode connected to a second end of the second capacitor and an anode connected to the output connector;

a fourth diode having an anode connected to the second end of the second capacitor;

a second transistor having a first end connected to a cathode of the fourth diode, a second end connected to the reference connector, and a gate connected to a third input connector; and an RC circuit connected between the output connector and the reference connector, the RC circuit having a third capacitor and a first resistor connected in parallel.

16. The power supply circuit of claim 15 further comprising:

a second resistor connected in series with the first transistor between the second end of the first transistor and the reference connector; and a third resistor connected in series with the second transistor between the second end of the second transistor and the reference connector.

17. The power supply circuit of claim 15, wherein an A.C. power supply is connected to the first input connector, and waveform generators are connected to the second and third input connectors.

18. The power supply circuit of claim 17, wherein the waveform generators generate pulses at various frequencies and duty cycles.

19. The power supply circuit of claim 18, wherein the waveform generator connected to the second input connector generates pulses that are out of phase with the pulses generated by the waveform generator connected to the third input connector.

20. The power supply circuit of claim 18, wherein an output signal is formed that combines A.C. and D.C. voltages, and the D.C. voltages are at least one of a positive voltage and a negative voltage.

21. A power supply circuit comprising:

a first capacitor having a first end connected to a first input connector;

a first diode having an anode connected to a second end of the first capacitor and a cathode connected to an output connector;

a second diode having a cathode connected to the anode of the first diode;

a first resistor having a first end connected to a reference connector;

a first transistor having a first end connected to an anode of the second diode, a second end and a gate;

a second transistor having a first end connected to the second end of the first transistor, a second end connected to a second end of the first resistor, and a gate connected to a second input connector;

a second resistor having a first end connected to the anode of the second diode and a second end connected to the gate of the first transistor;

a third resistor having a first end connected to the gate of the first transistor and a second end connected to the gate of the second transistor;

a second capacitor having a first end connected to the gate of the first transistor and a second end connected to the gate of the second transistor;

a third capacitor having a first end connected to the first input connector;

a third diode having a cathode connected to a second end of the third capacitor and an anode connected to the output connector;

a fourth diode having an anode connected to the second end of the third capacitor;

a fourth resistor having a first end connected to the reference connector;

a third transistor having a first end connected to a second end of the fourth resistor, a second end, and a gate connected to a third input connector;

a fourth transistor having a first end connected to the second end of the third transistor, a second end connected to a cathode of the fourth diode, and a gate;

a fifth resistor having a first end connected to the gate of the third transistor and a second end connected to the gate of the fourth transistor;

a sixth resistor having a first end connected to the gate of the fourth transistor and a second end connected to the cathode of the fourth diode;

a fourth capacitor having a first end connected to the gate of the third transistor and a second end connected to the gate of the fourth transistor; and an RC circuit connected between the output connector and the reference connector, the RC circuit having a fifth capacitor and a seventh resistor connected in parallel.

22. The power supply circuit of claim 21, wherein an A.C. power supply is connected to the first input connector, and waveform generators are connected to the second and third input connectors.

23. The power supply circuit of claim 22, wherein the waveform generators generate pulses at various frequencies and duty cycles.

24. The power supply circuit of claim 23, wherein the waveform generator connected to the second input connector generates pulses that are out of phase with the pulses generated by the waveform generator connected to the third input connector.

25. The power supply circuit of claim 23, wherein an output signal is formed that combines A.C. and D.C. voltages, and the D.C. voltages are at least one of a positive voltage and a negative voltage.

26. A power supply circuit for generating voltage signals for a toner developer apparatus, the power supply circuit connected between a transformer and the developer, the transformer having a primary winding connected to an A.C. power supply and three secondary windings, the first and second secondary windings each having a first end connected to a reference potential, the developer having a donor roller connected to a first output connector of the power supply circuit, a magnetic roller connected to a second output connector of the power supply circuit and powder cloud wires connected to a first end of the third secondary winding of the transformer, the first output connector of the power supply circuit being connected to a second end of the third secondary winding of the transformer, the power supply circuit comprising:

a first capacitor having a first end connected to a second end of the first secondary winding of the transformer;

a first diode having an anode connected to a second end of the first capacitor and a cathode connected to the first output connector;

a second diode having a cathode connected to the anode of the first diode;

a first current control means having a current path between an anode of the second diode and the reference potential, a controller of the first current control means being connected to a first waveform generator;

a second capacitor having a first end connected to the second end of the first secondary winding of the transformer;

a third diode having a cathode connected to a second end of the second capacitor and an anode connected to the first output connector;

a fourth diode having an anode connected to the second end of the second capacitor;

a second current control means having a current path between a cathode of the fourth diode and the reference potential, a controller of the second current control means being connected to a second waveform generator;

a first RC circuit connected between the first output connector and the reference potential, the first RC circuit having a third capacitor and a first resistor connected in parallel;

a fourth capacitor having a first end connected to a second end of the second secondary winding of the transformer;

a fifth diode having an anode connected to a second end of the fourth capacitor and a cathode connected to the second output connector;

a sixth diode having a cathode connected to the anode of the fifth diode;

a third current control means having a current path between an anode of the sixth diode and the reference potential, a controller of the third current control means being connected to a third waveform generator;

a fifth capacitor having a first end connected to the second end of the second secondary winding of the transformer;

a seventh diode having a cathode connected to a second end of the fifth capacitor and an anode connected to the second output connector;

an eighth diode having an anode connected to the second end of the fifth capacitor;

a fourth current control means having a current path between a cathode of the eighth diode and the reference potential, a controller of the fourth current control means being connected to a fourth waveform generator; and a second RC circuit connected between the second output connector and the reference potential, the second RC circuit having a sixth capacitor and a second resistor connected in parallel.

27. The power supply circuit of claim 26, wherein the first through fourth current control means comprise transistors, and wherein a gate of each of the transistors is the controller of the respective current control means.

28. The power supply circuit of claim 27, wherein the first transistor is one of an N-channel FET, a P-channel FET, a MOSFET, and an HV FET, the second transistor is one of an N-channel FET, a P-channel FET, a MOSFET, and an HV FET, the third transistor is one of an N-channel FET, a P-channel FET, a MOSFET and an HV FET, and wherein the fourth transistor is one of an N-channel FET, a P-channel FET, a MOSFET and an HV FET.

29. The power supply circuit of claim 26, wherein the first through fourth waveform generators generate pulses at various frequencies and duty cycles.

30. The power supply circuit of claim 29, wherein the first waveform generator generates pulses that are out of phase with the pulses generated by the second waveform generator, and the third waveform generator generates pulses that are out of phase with the pulses generated by the fourth waveform generator.

31. An apparatus having an exposing section for forming a latent image on a charge retentive surface, a developing section for developing the latent image with at least one toner by using at least one developer, a transferring section for transferring the developed latent images onto a copy medium, and a fusing section for fusing the developed latent images to the copy medium, the at least one developer comprising:

a magnetic roller for magnetically charging the toner;

a donor roller inducing a voltage potential on the magnetically charged toner;

a plurality of powder cloud wires for removing the toner from the donor roller to form a cloud of toner, the toner developing the latent image by flying across a gap between the powder cloud wires and the charge retentive surface;

a transformer having a primary winding connected to an A.C. power supply and three secondary windings, the first and second secondary windings each having a first end connected to a reference potential, and a first end of the third secondary winding being connected to the powder cloud wires; and a power supply circuit connected to the first through third secondary windings of the transformer, the power supply circuit generating voltage signals applied to the magnetic roller, the donor roller and the plurality of powder cloud wires, the power supply circuit comprising:

a first capacitor having a first end connected to a second end of the first secondary winding of the transformer;

a first diode having an anode connected to a second end of the first capacitor and a cathode connected to a first output connector, the first output connector being connected to a second end of the third secondary winding of the transformer and the donor roller;

a second diode having a cathode connected to the anode of the first diode;

a first current control means having a current path between an anode of the second diode and the reference potential, a controller of the first current control means being connected to a first waveform generator;

a second capacitor having a first end connected to the second end of the first secondary winding of the transformer;

a third diode having a cathode connected to a second end of the second capacitor and an anode connected to the first output connector;

a fourth diode having an anode connected to the second end of the second capacitor;

a second current control means having a current path between a cathode of the fourth diode and the reference potential, a controller of the second current control means being connected to a second waveform generator;

a first RC circuit connected between the first output connector and the reference potential, the first RC circuit having a third capacitor and a first resistor connected in parallel;

a fourth capacitor having a first end connected to a second end of the second secondary winding of the transformer;

a fifth diode having an anode connected to a second end of the fourth capacitor and a cathode connected to a second output connector, the second output connector being connected to the magnetic roller;

a sixth diode having a cathode connected to the anode of the fifth diode;

a third current control means having a current path between an anode of the sixth diode and the reference potential, a controller of the third current control means being connected to a third waveform generator;

a fifth capacitor having a first end connected to the second end of the second secondary winding of the transformer;

a seventh diode having a cathode connected to a second end of the fifth capacitor and an anode connected to the second output connector;

an eighth diode having an anode connected to the second end of the fifth capacitor;

a fourth current control means having a current path between a cathode of the eighth diode and the reference potential, a controller of the fourth current control means being connected to a fourth waveform generator; and a second RC circuit connected between the second output connector and the reference potential, the second RC circuit having a sixth capacitor and a second resistor connected in parallel.

32. The apparatus of claim 31, wherein the first through fourth current control means comprise transistors, and a gate of each of the transistors is the controller of the respective current control means.

33. The apparatus of claim 32, wherein each of the transistors are one of an N-channel FET, a P-channel FET, a MOSFET, and an HV FET.

34. The apparatus of claim 31, wherein the first through fourth waveform generators generate pulses at various frequencies and duty cycles.

35. The apparatus of claim 34, wherein the first waveform generator generates pulses that are out of phase with the pulses generated by the second waveform generator, and the third waveform generator generates pulses that are out of phase with the pulses generated by the fourth waveform generator.

* * * * *